United States Patent
Yang (10) Patent No.: US 10,411,446 B2
(45) Date of Patent: Sep. 10, 2019

(54) LIQUID-TIGHT CONNECTOR (71) Applicant: Jinxing Yang, Roland Heights, CA (US)

(72) Inventor: Jinxing Yang, Roland Heights, CA (US)

( * ) Notice: Subject to any disclaimer, the term of this patent is extended or adjusted under 35 U.S.C. 154(b) by 29 days.

(21) Appl. No.: 15/480,363

(22) Filed: Apr. 5, 2017

(65) Prior Publication Data

US 2017/0284572 A1  Oct. 5, 2017

Related U.S. Application Data (60) Provisional application No. 62/318,699, filed on Apr. 5, 2016.

(51) Int. Cl.
  *F16L 27/08* (2006.01)
  *H02G 3/06* (2006.01)

(52) U.S. Cl.
  CPC .............. *H02G 3/06* (2013.01); *F16L 27/08* (2013.01)

(58) Field of Classification Search
  CPC ......... H02G 3/06; F16L 27/08; F16L 27/0804
  USPC ................. 285/153.1, 154.1, 154.4
  See application file for complete search history.

(56) References Cited

U.S. PATENT DOCUMENTS

| | | | | |
|---|---|---|---|---|
| 954,504 A * | 4/1910 | Drew | ................... | F16L 27/0849 285/181 |
| 1,809,582 A * | 6/1931 | Church | ................... | H02G 3/06 285/154.1 |
| 2,052,394 A * | 8/1936 | Fullman | ................ | H02G 3/0683 285/154.4 |
| 3,791,680 A * | 2/1974 | Cleare | ................... | H02G 3/0616 285/148.13 |
| 4,288,110 A * | 9/1981 | Grenell | ..................... | H02G 3/06 285/148.13 |
| 6,114,631 A * | 9/2000 | Gretz | ................... | F16L 27/0837 174/50.52 |
| 6,491,325 B1 * | 12/2002 | Boche | ................... | F16L 27/0816 285/256 |
| 6,932,390 B1 * | 8/2005 | Gretz | ................... | F16L 27/0837 285/181 |
| 7,658,418 B1 * | 2/2010 | Elbaz | ....................... | H02G 3/06 174/60 |
| 8,602,460 B2 * | 12/2013 | Heuwinkel | .......... | A47C 27/085 285/181 |
| 2005/0035593 A1 * | 2/2005 | Auray | ................... | H02G 3/0675 285/154.1 |

(Continued)

FOREIGN PATENT DOCUMENTS

DE     10352006 A1 *  6/2005  ............... H02G 3/06
FR      2864713 A1 *  7/2005  ............... H02G 3/06

*Primary Examiner* — David Bochna
(74) *Attorney, Agent, or Firm* — Che-Yang Chen; Law Offices of Scott Warmuth (57) ABSTRACT

A liquid-tight connector may include a riveting cap, a rotating connector, a threading unit, a sealing ring and a conduit locknut. In one embodiment, an O-ring may be disposed between the rotating connector and the threading unit to enhance the liquid-tight effect of the connector. It is important to note that the rotating connector is configured to engage with the riveting cap through a threaded section, while the rotating connector can freely rotate on the threading unit, so when one end of the conduit is secured to one terminal, the other end of the conduit can still be rotated with the liquid-tight connector until it is secured to the other terminal.

7 Claims, 8 Drawing Sheets

(56) References Cited

U.S. PATENT DOCUMENTS

| | | | |
|---|---|---|---|
| 2008/0224468 A1* | 9/2008 | Dohm | F16L 27/08 285/282 |
| 2008/0261428 A1* | 10/2008 | Brodeur | H02G 3/06 439/246 |
| 2014/0265308 A1* | 9/2014 | Reilly | H02G 3/06 285/153.1 |

* cited by examiner

LIQUID-TIGHT CONNECTOR

CROSS-REFERENCE TO RELATED APPLICATIONS

This application claims priority under 35 U.S.C. § 119(e) to U.S. Provisional Patent Application Ser. No. 62/318,699, filed on Apr. 5, 2016, the entire contents of which are hereby incorporated by reference.

FIELD OF THE INVENTION

The present invention relates to liquid-tight conduit fittings, and more particularly to liquid-tight conduit fittings used to terminate flexible conduit to electrical enclosures.

BACKGROUND OF THE INVENTION

In the field of wiring homes and buildings, whether for new construction or for improvements or expansion, substantial development and product improvements may be necessary. Typically, these improvements are directed to enabling installers to securely mount any desired wiring in any desired location in the most efficient and quickest manner.

In any particular installation or location, various cables must be interconnected to each other as well as connected to the primary power supply in a suitable power distributing junction box or fuse box. In each of these instances, metal sheath cables, within which the electric power carrying wires are contained, must be securely mounted to the housing of the junction box or outlet box, or connected to appropriate devices, in a protected area.

Liquid tight conduit fittings are commonly used to terminate an end extent of a length of flexible conduit to an electrical enclosure such as a junction box. It will be appreciated that such conduit fittings, which are often formed from a plastic material such as UV resistant PVC, may be used in both exterior and interior applications. The fittings must be able to withstand certain environmental and/or physical conditions without failure.

Figure 1:
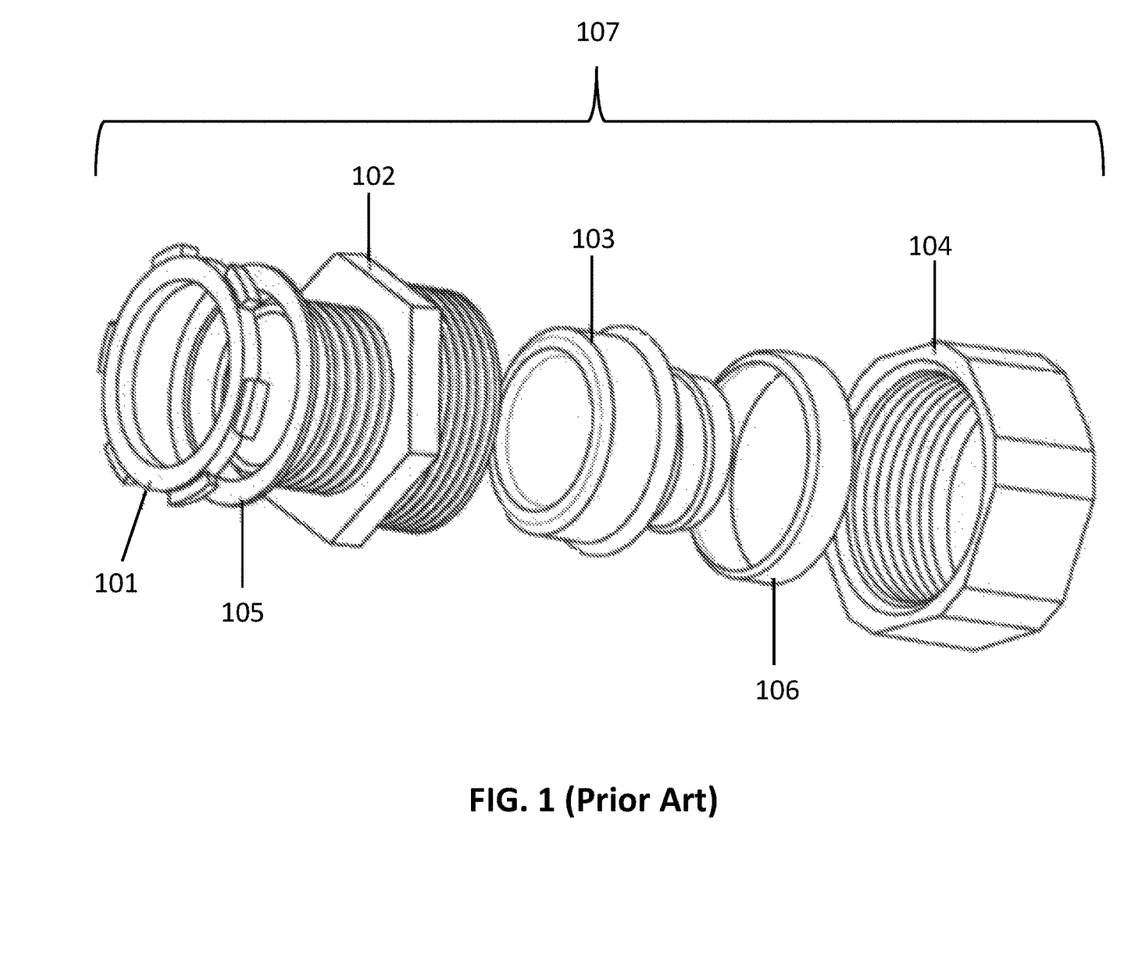
FIG. 1 illustrates a prior art disclosing a liquid-tight connector which may be difficult for the user to secure both ends of the conduit through the liquid-tight connectors to two different terminals.

As shown in FIG. 1, prior art coupling devices 107 are generally tubular, with threaded opposite ends for receiving the conduit and/or opening. These devices 107 contain many components including a locknut 101, a sealing ring 105, a connector body 102, a ferrule 103, a compression ring 106 and a compression nut 104. Most prior art devices disadvantageously require a multi-step installation process that requires the initial disassembly of the packed coupling device 107 before re-assembly and installation. Also, it is very difficult for the user to secure both ends of the conduit through the liquid-tight connectors to two different terminals such as two junction boxes because when one end is secured to one terminal, the conduit is totally fixed and cannot be moved or rotated to enable the other end thereof to be secured to the other terminal. Therefore, there remains a need for a new and improved design for a liquid-tight connector to overcome the problems presented above.

SUMMARY OF THE INVENTION

It is an object of the present invention to provide a liquid-tight connector that can be used to easily secure both ends of the conduit to the terminals.

It is another object of the present invention to provide a liquid-tight connector that can be used to secure one end of the conduit to one terminal and the enable the other end of the conduit to rotate to be secured to the other terminal.

In one aspect, a liquid-tight connector may include a riveting cap, a rotating connector, a threading unit, a sealing ring and a conduit locknut. In one embodiment, an O-ring may be disposed between the rotating connector and the threading unit to enhance the liquid-tight effect of the connector. It is important to note that the rotating connector is configured to engage with the riveting cap through a threaded section, while the rotating connector can freely rotate on the threading unit, so when one end of the conduit is secured to one terminal, the other end of the conduit can still be rotated with the liquid-tight connector to be secured to the other terminal.

More specifically, the threading unit has an engaging groove to engage with a corresponding engaging portion. In one embodiment, the engaging portion has a pair of protrusions to movably engage with the engaging groove, so the rotating connector can freely rotate on the threading unit. In another embodiment, the threading unit has a threaded section to engage with the conduit locking unit.

When in use, a conduit is provided and the connector can be attached to each end of the conduit. It is noted that even though the conduit is connected to the connectors, the rotating connector can still freely rotate on the threading unit. Thus, the conduit 300 can be easily secured on terminals with the connectors. More specifically, as discussed above, the riveting cap and the rotating connector are engaged with each other, while the rotating connector can still freely rotate on the threading unit. Therefore, when one end of the conduit is being secured on the terminal, the other end of the conduit can be easily secured on the other terminal because the conduit can be rotated due to the rotation movement of the rotating connector on the threading unit. In another embodiment, the conduit can be secured at junction boxes on both ends.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Figure 2:
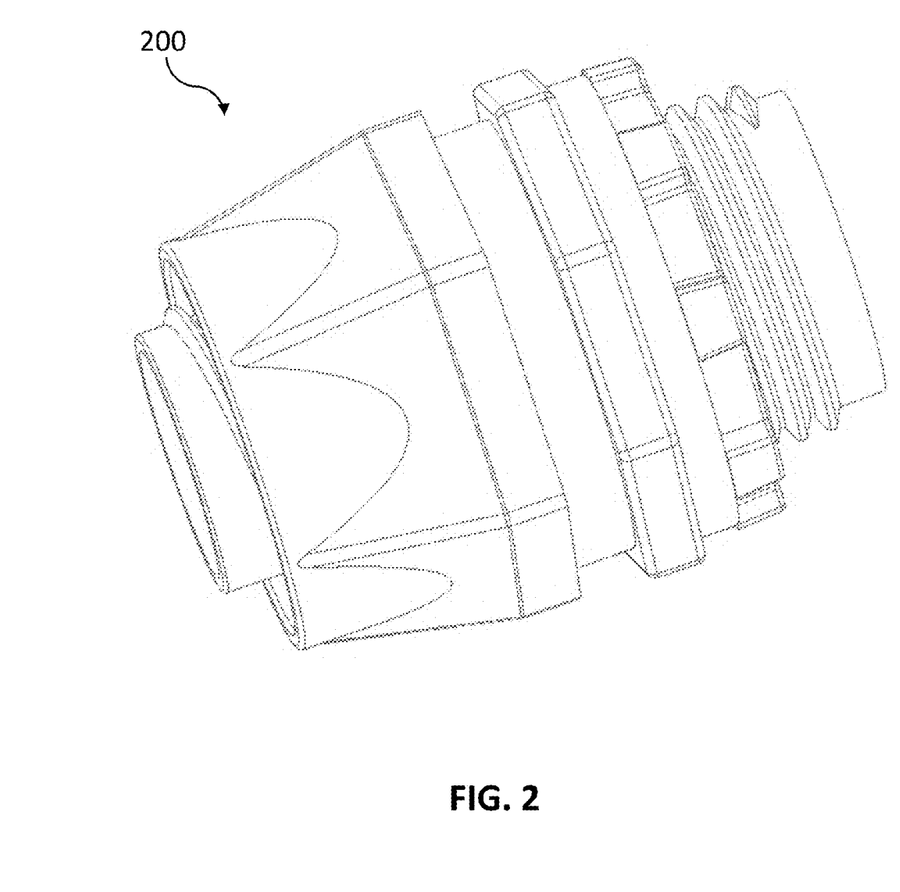
FIG. 2 illustrates a schematic view of the liquid-tight connector in the present invention.
Figure 3:
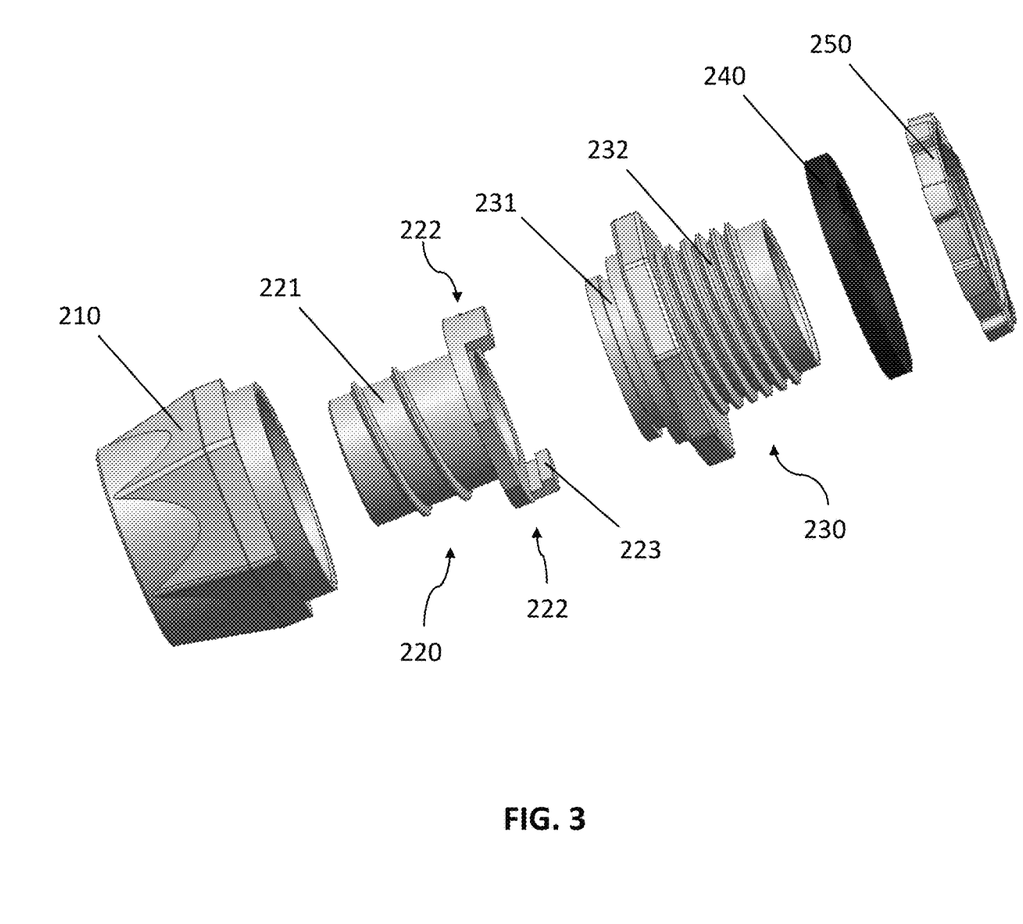
FIG. 3 illustrates a schematic view of one embodiment of the liquid-tight connector in the present invention.
Figure 4:
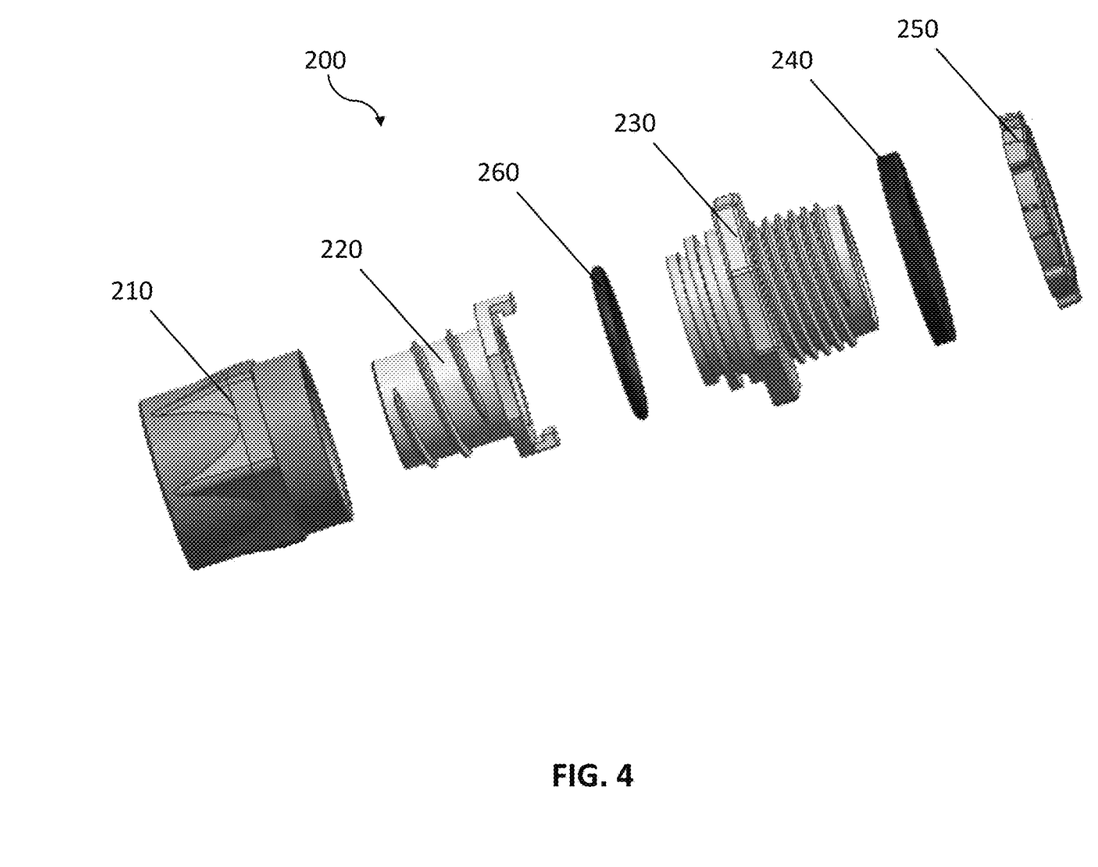
FIG. 4 illustrates a schematic view of another embodiment of the liquid-tight connector in the present invention.
Figure 5:
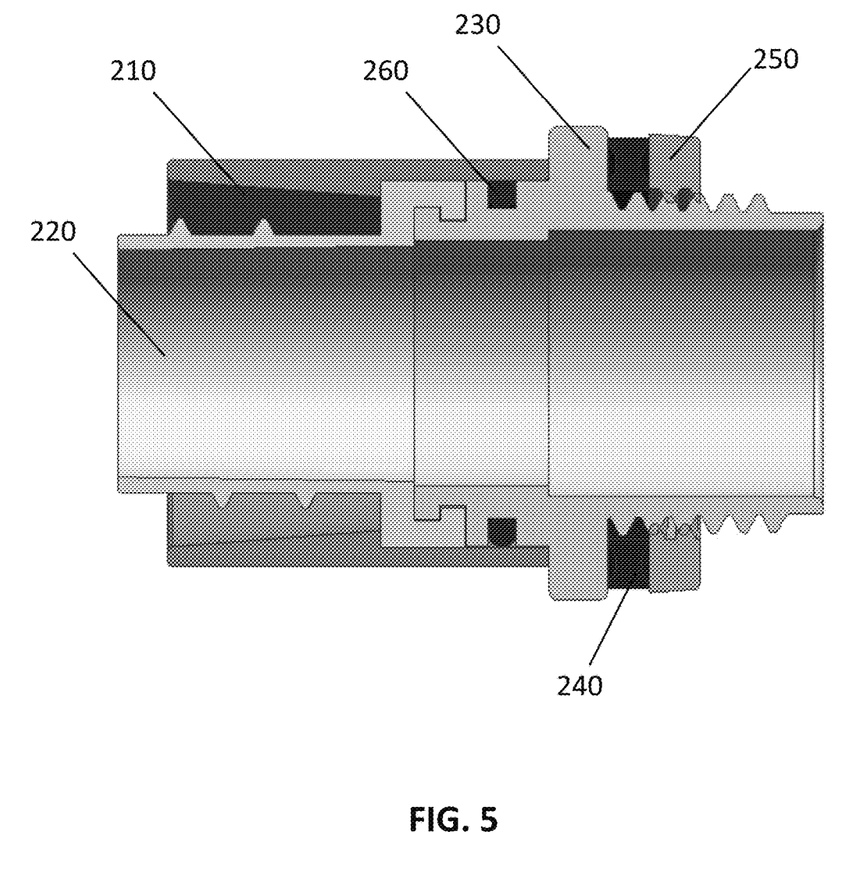
FIG. 5 is a sectional view of the liquid-tight connector in the present invention.

In one aspect, as shown in FIGS. 2 and 3, a liquid-tight connector 200 may include a riveting cap 210, a rotating connector 220, a threading unit 230, a sealing ring 240 and a conduit locknut 250. In one embodiment, an O-ring 260 may be disposed between the rotating connector 220 and the threading unit 230 to enhance the liquid-tight effect of the connector 200, as shown in FIGS. 4 and 5. It is important to note that the rotating connector 220 is configured to engage with the riveting cap 210 through a threaded section 221, while the rotating connector 220 can freely rotate on the threading unit 230, so when one end of the conduit is secured to one terminal, the other end of the conduit can still be rotated with the liquid-tight connector 200 to be secured to the other terminal.

More specifically, the threading unit 230 has an engaging groove 231 surrounding a front portion thereof to engage with a corresponding engaging portion 222 of the rotating connector 220. In one embodiment, the engaging portion 222 has a pair of protrusions 223 to movably engage with the engaging groove 231, so the rotating connector 220 can freely rotate on the threading unit 230. In another embodiment, the threading unit 230 has a threaded section 232 to engage with the conduit locking unit 250.

Figure 6:
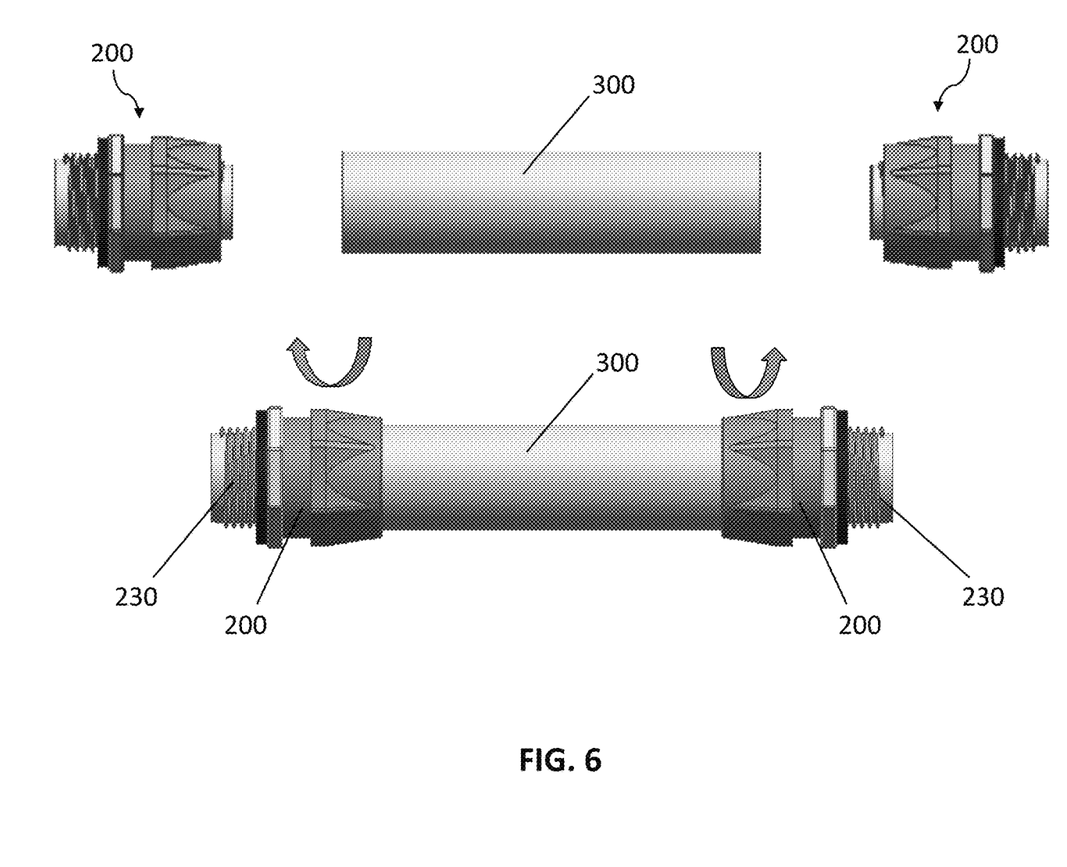
FIGS. 6 and 6a illustrate a schematic view of the liquid-tight connector on both end of the conduit to secure the conduit to two terminals.
Figure 6A:
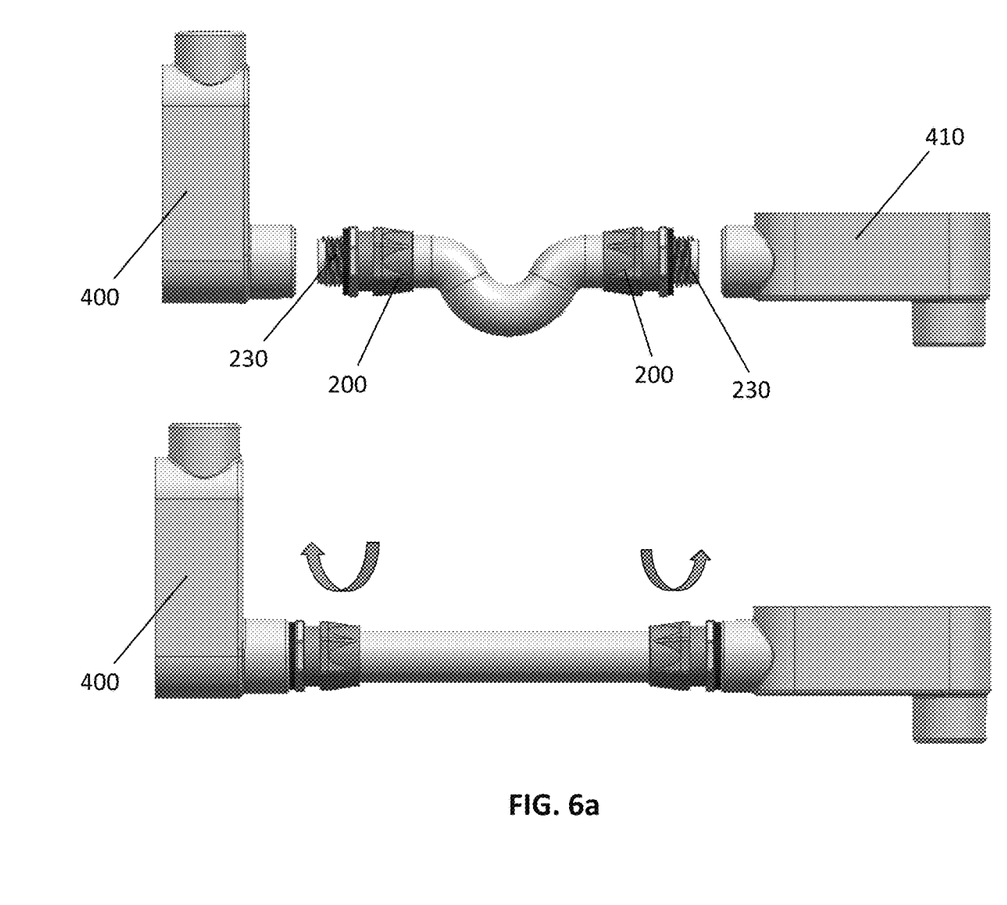
Figure 7:
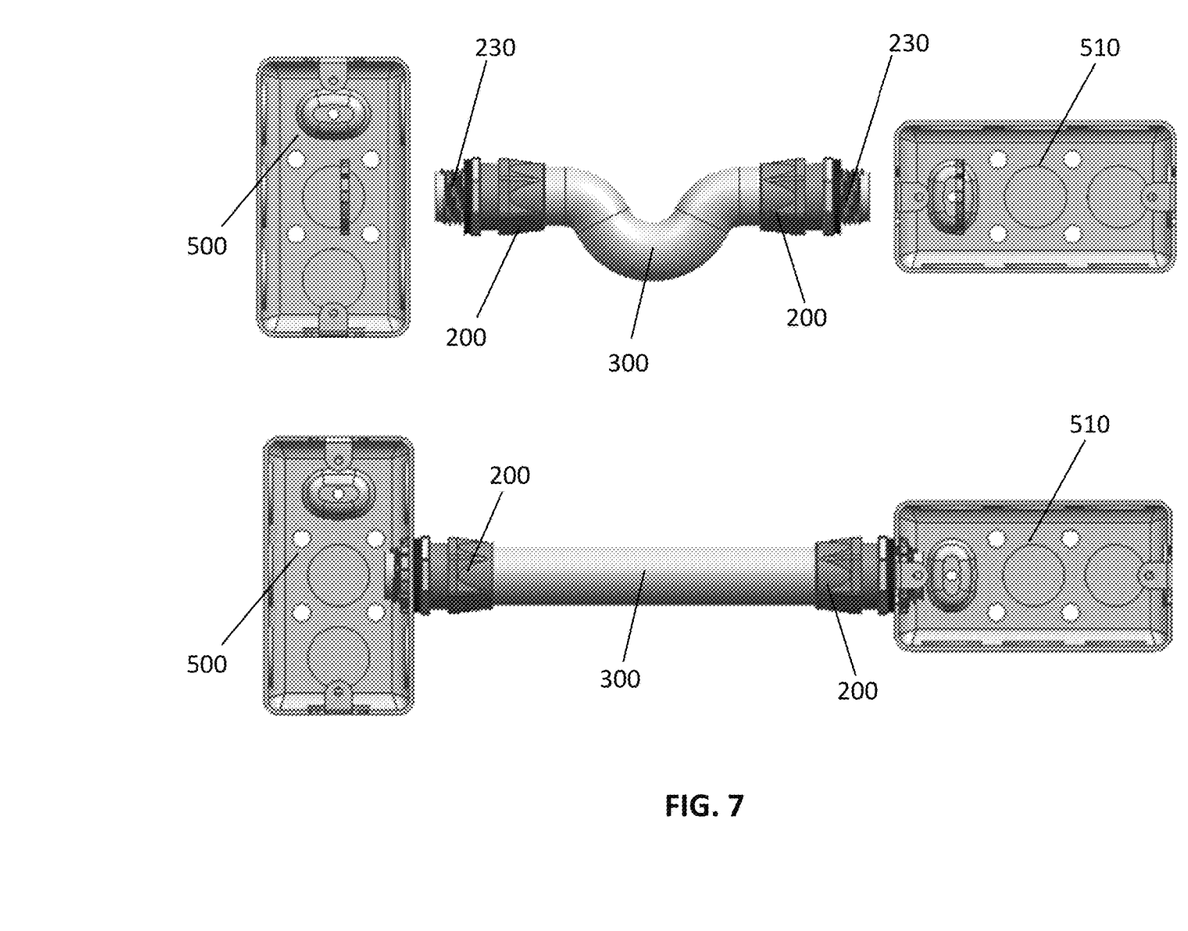
FIG. 7 illustrates a schematic view of the liquid-tight connector on both end of the conduit to secure the conduit to two junction boxes.

When in use, a conduit 300 is provided and the connector 200 can be attached to each end of the conduit 300 as shown in FIG. 6. It is noted that even though the conduit 300 is connected to the connectors 200, the rotating connector 220 can still freely rotate on the threading unit 230. Thus, the conduit 300 can be easily secured on terminals 400 and 410 with the connectors 200 as shown in FIGS. 6 and 6a. More specifically, as discussed above, the riveting cap 210 and the rotating connector 220 are engaged with each other, while the rotating connector 220 can still freely rotate on the threading unit 230. Therefore, when one end of the conduit 300 is being secured on the terminal 400, the other end of the conduit 300 can be easily secured on the other terminal 410 because the conduit 300 can be rotated due to the rotation movement of the rotating connector 220 on the threading unit 230. In another embodiment, the conduit 300 can be secured at junction boxes 500 and 510 on both ends as shown in FIG. 7.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A liquid-tight connector for a conduit comprising a riveting cap, a rotating connector, a threading unit, a sealing ring and a conduit locknut, wherein the rotating connector is configured to engage with the riveting cap through a threaded section, and the rotating connector is configured to rotate on the threading unit, so when one end of the conduit is secured to one terminal, the other end of the conduit is configured to rotate with the liquid-tight connector until the other end of the conduit is secured to the other terminal, wherein the threading unit has an engaging groove surrounding a front portion thereof to engage with a corresponding engaging portion of the rotating connector.

2. The liquid-tight connector for a conduit of claim 1, wherein an O-ring is disposed between the rotating connector and the threading unit to enhance the liquid-tight effect of the connector.

3. The liquid-tight connector for a conduit of claim 2, wherein the threading unit has an engaging groove surrounding a front portion thereof to engage with a corresponding engaging portion of the rotating connector.

4. The liquid-tight connector for a conduit of claim 3, wherein the engaging portion has a pair of protrusions to movably engage with the engaging groove, so the rotating connector can freely rotate on the threading unit.

5. The liquid-tight connector for a conduit of claim 4, wherein the threading unit has a threaded section to engage with the conduit locknut.

6. The liquid-tight connector for a conduit of claim 1, wherein the engaging portion has a pair of protrusions to movably engage with the engaging groove, so the rotating connector can freely rotate on the threading unit.

7. The liquid-tight connector for a conduit of claim 6, wherein the threading unit has a threaded section to engage with the conduit locknut.

* * * * *